United States Patent
Parihar et al.

(10) Patent No.: US 11,012,141 B1
(45) Date of Patent: May 18, 2021

(54) SYSTEMS AND METHODS FOR SELECTING A DONOR FOR A RELAY WIRELESS DEVICE

(71) Applicant: Sprint Spectrum LP, Overland Park, KS (US)

(72) Inventors: Vanil Parihar, Overland Park, KS (US); Nitesh Manchanda, Overland Park, KS (US); Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 247 days.

(21) Appl. No.: 15/618,614

(22) Filed: Jun. 9, 2017

(51) Int. Cl.
| | |
|---|---|
| *H04W 16/28* | (2009.01) |
| *H04W 48/16* | (2009.01) |
| *H04W 88/04* | (2009.01) |
| *H04B 7/155* | (2006.01) |
| *H04B 17/345* | (2015.01) |
| *H04L 5/00* | (2006.01) |
| *H04B 17/10* | (2015.01) |
| *H04B 17/336* | (2015.01) |
| *H04W 88/08* | (2009.01) |

(52) U.S. Cl.
CPC ....... *H04B 7/15507* (2013.01); *H04B 17/103* (2015.01); *H04B 17/336* (2015.01); *H04B 17/345* (2015.01); *H04L 5/0048* (2013.01); *H04W 16/28* (2013.01); *H04W 48/16* (2013.01); *H04W 88/04* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2010/0323614 A1* | 12/2010 | Yu | H04B 7/155 455/9 |
| 2014/0099881 A1* | 4/2014 | Boudreau | H04W 16/10 455/7 |
| 2014/0099983 A1* | 4/2014 | Sarca | H04W 72/08 455/501 |
| 2014/0106666 A1* | 4/2014 | Nogueira-Nine | H04B 7/1555 455/25 |
| 2015/0063268 A1 | 3/2015 | Dinan | |
| 2015/0085718 A1 | 3/2015 | Chen et al. | |
| 2015/0085720 A1 | 3/2015 | Gaal et al. | |
| 2016/0044689 A1* | 2/2016 | Wen | H04J 11/0023 370/330 |
| 2016/0197671 A1 | 7/2016 | Hwang et al. | |
| 2017/0207828 A1* | 7/2017 | Jung | H04B 7/0617 |
| 2018/0234524 A1* | 8/2018 | Cheng | H04B 7/15 |

* cited by examiner

*Primary Examiner* — Ruihua Zhang

(57) ABSTRACT

Exemplary embodiments described herein include systems, methods, and nodes for selecting a donor for a relay wireless device. Candidate signal arcs of a predetermined angle for a relay wireless device that do not meet an interference criteria are determined. Signals levels are scanned for the relay wireless device for signals received from a plurality of donor access nodes, the scanning iterating over the determined candidate signal arcs that do not meet the interference criteria. Candidate donor access nodes with a received signal level at the relay wireless device that meets a signal level criteria for each candidate signal arc based on the scanning are determined. And a donor access node is selected for the relay wireless device based on the determined candidate donor access nodes.

18 Claims, 7 Drawing Sheets

SYSTEMS AND METHODS FOR SELECTING A DONOR FOR A RELAY WIRELESS DEVICE

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to designate a wireless device as a relay node or relay UE for relaying communication between a base station or access node (donor access node), and an end-user wireless device. Relay wireless devices may be used at the edge of a coverage area of an access node to improve coverage and/or service, as well as in crowded areas having a high number of other wireless devices to increase the available throughput to the end-user wireless devices being relayed. However, end-user wireless device performance can be dependent on the quality of the connection between the relay wireless device and the donor access node. Because of this dependency, donor selection is an important consideration for a relay wireless device configuration. Accordingly, efficiency in donor selection for a relay wireless device may increase quality of service for users of the communication network.

Overview

Exemplary embodiments described herein include systems, methods, and nodes for selecting a donor for a relay wireless device. Candidate signal arcs of a predetermined angle for a relay wireless device that do not meet an interference criteria are determined. Signals levels are scanned for the relay wireless device for signals received from a plurality of donor access nodes, the scanning iterating over the determined candidate signal arcs that do not meet the interference criteria. Candidate donor access nodes with a received signal level at the relay wireless device that meets a signal level criteria for each candidate signal arc based on the scanning are determined. And a donor access node is selected for the relay wireless device based on the determined candidate donor access nodes.

DETAILED DESCRIPTION

In an embodiment, methods and system are described for selecting a donor for a relay wireless device based on feedback. For example, a relay wireless device may connect a small cell to an access node such that the relay wireless device relays backhaul traffic to and from the access node and small cell. In some embodiments, a donor access node may be selected for a relay wireless device based on signals received at the relay wireless device from potential donor access nodes. In an embodiment, relay wireless device may periodically scan for potential donor access nodes and select a donor based on the scanning. However, certain signal arcs for the relay wireless device may experience interference or obstruction such that scanning over these one or more signal arcs may not provide useful received signal levels from potential donor access nodes for the purposes of donor selection. Accordingly, donor scanning and selection that considers the channel quality over signal arcs may provide benefits to users of the system.

In some embodiment, uplink communication between the relay wireless device and the selected donor access node may impact such quality of service at least because wireless backhaul communication may include uplink control information that relies on a reliable and/or quality uplink channel between the relay wireless devices and its donor access node. Accordingly, donor selection that considers the uplink channel between a relay wireless device and its potential donor access node may provide benefits to users of the system.

Figure 1:
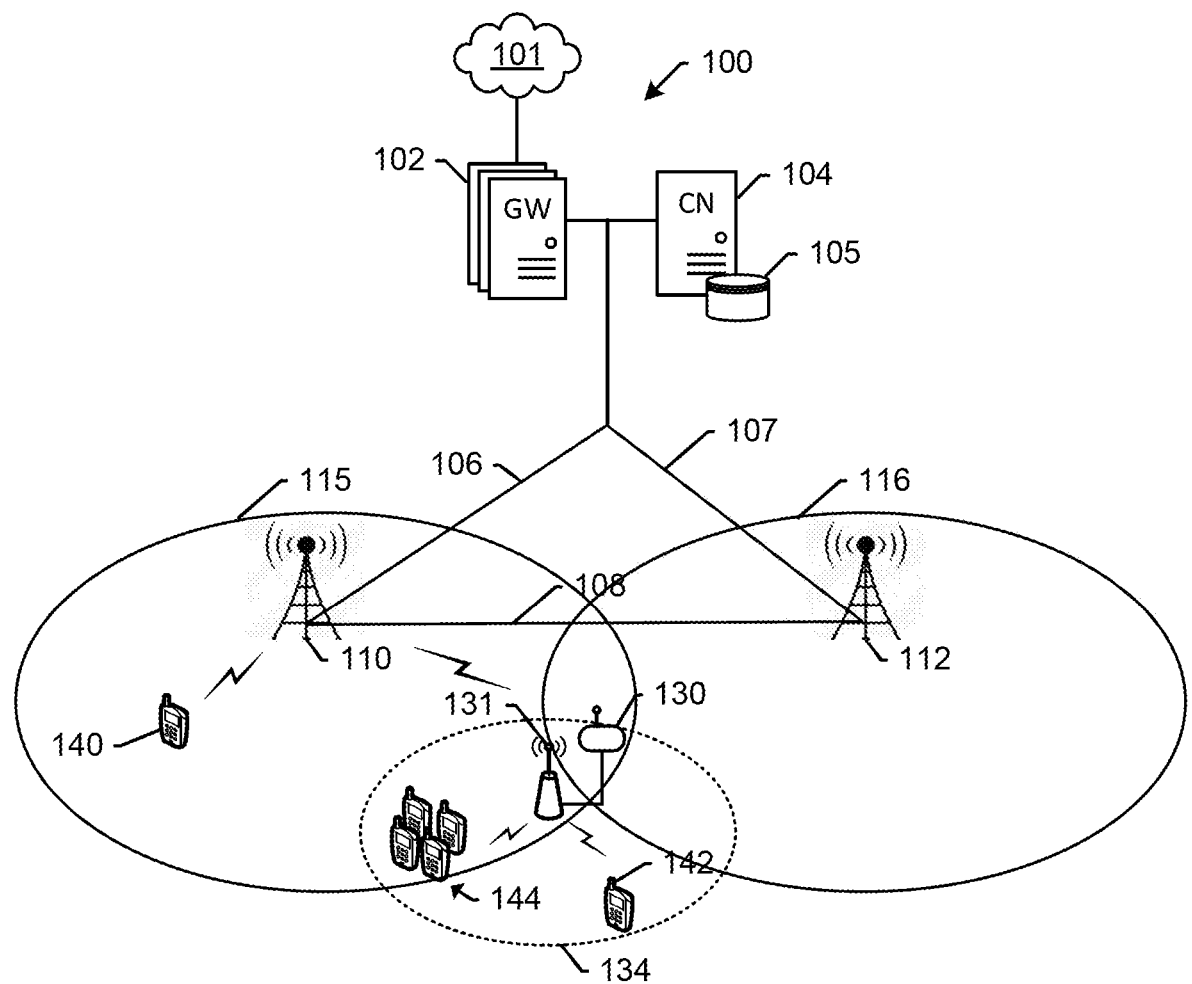
FIG. 1 depicts an exemplary system for selecting a donor for a relay wireless device.

FIG. 1 depicts an exemplary system 100 for selecting a donor for a relay wireless device based on feedback. System 100 comprises a communication network 101, gateway nodes 102, controller node 104, access nodes 110 and 112, relay wireless device 130, small cell 131, and wireless devices 140, 142, and 144, which may comprise end-user wireless devices. In an embodiment, access node 110 provides services to wireless devices 142 and 144 via a relay access node that comprises a combination of relay wireless device 130 and small cell 131, which may comprise a relay access point or node. Consequently, access nodes 110 may be referred to as donor access nodes. Relay wireless device 130 is thus configured to relay services from access node 110 to wireless devices 142 and 144.

Access node 110 is illustrated as having coverage area 115, access node 112 is illustrated as having coverage area 116, and small cell 131 is illustrated as having coverage area 134. Wireless devices 140 and 144 are located within coverage area 115, wireless devices 142 and 144 are located within coverage area 134, and small cell 131 is located within coverage areas 115 and 116. In an embodiment, based on the coverage areas for the access nodes which overlap relay wireless device 130, access node 110 and access node 112 may comprise potential donor access nodes for relay wireless device 130 and small cell 131. In an embodiment, cluster of wireless devices 144 may access network services using the combination of relay wireless device 130 and small cell 131, rather than overload access node 110, which may be serving numerous other devices, such as wireless device 140. Moreover, wireless device 142 that is outside coverage area 115 may access network services from access node 110 by virtue of being connected to relay wireless device 130 via small cell 131.

In an embodiment, to achieve this, relay wireless device 130 may comprise a customer premise equipment (CPE), which may be any stationary LTE wireless device having a stronger computational & RF capability versus standard wireless devices, as well as a directional antenna and a dedicated power supply. Relay wireless device 130 also may be communicatively coupled to small cell 131. Small cell 131 may include a mini-macro, picocell, femtocell, or the like that are capable of providing a wireless access point for wireless devices 142 and 144, of which wireless device 144 comprises a cluster of wireless devices.

In an embodiment, relay wireless device 130 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from access nodes 110 and/or 112 are amplified and transmitted by relay wireless device 130 to one or more of wireless devices 142 and 144. Likewise, RF signals received from wireless devices 142 and 144 are amplified and transmitted by relay wireless device 130, to either access node 110 or access node 112. Alternatively or in addition, a layer 2 relay device performs a decode and forward (DF) function. RF signals received from access node 110 or 112 are demodulated and decoded, then encoded and modulated again before being transmitted by relay wireless device 130 to one or more of wireless devices 142 and 144. Likewise, RF signals received from one or more of wireless devices 142 and 144 are demodulated and decoded, then encoded and modulated again before being transmitted by relay wireless device 130 to access node 110 or 112. Alternatively or in addition, a layer 3 relay device also performs a decode and forward function. However, a layer 3 relay device also performs additional processing (such as ciphering and/or data concatenation/segmentation/resassembly). In other words, relay wireless device 130 may perform demodulation and decoding of the received RF signals (either uplink or downlink), processing of the received data, then encode, modulate, and transmit the data to one or more of wireless devices 142 and 144.

Relay wireless device 130 and wireless devices 140, 142 and 144, may be any device, system, combination of devices, or other such communication platform capable of communicating wirelessly with access node 110 using one or more frequency bands deployed by access node 110. Relay wireless devices 130 and wireless devices 140, 142 and 144 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible. In some embodiments, relay wireless device 130 includes stronger computational & radiofrequency capabilities than an average wireless device, as well as a directional antenna, and dedicated power supply, so that they can sustain an over-the-air backhaul link for wireless devices 142 and 144 that attach to small cell 131.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by relay wireless device 130, and wireless devices 140, 142, and 144. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107, and 108 can use various communication media, such as air, space, metal, optical fiber, or some other signal propagation path—including combinations thereof. Communication links 106, 107, and 108 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof.

Communication links 106 and 107 may include S1 communications links and communication link 108 may comprise an X2 communication link. Other wireless protocols can also be used. Communication links 106, 107, and 108 can be a direct link or might include various equipment, intermediate components, systems, and networks. Communication links 106, 107, and 108 may comprise many different signals sharing the same link Gateway nodes 102 can be any network node or plurality of network nodes that are configured to interface with other network nodes using various protocols. Gateway nodes 102 can communicate user data over system 100. Gateway nodes 102 can be standalone computing devices, computing systems, or network components, and can be accessible, for example, by a wired or wireless connection, or through an indirect connection such as through a computer network or communication network. For example, gateway nodes 102 can include a serving gateway (S-GW) and/or a public data network gateway (P-GW), etc. Gateway nodes 102 can include a relay S-GW/P-DW combination for providing gateway services to relay wireless device 130, as well as a UE S-GW/P-DW combination for providing gateway services to one or more of wireless devices 140, 142, and 144. In embodiments, data packets such as voice over IP (VoIP) data packets may be routed from one or more of relay wireless device 130, and wireless devices 140, 142, and 144 to a relay S-GW/P-GW first, and then to a UE S-GW/P-GW. However, persons having ordinary skill in the art would recognize that gateway nodes 102 are not limited to any specific technology architecture, such as Long Term Evolution (LTE), and can be used with any network architecture and/or protocol.

Each of gateway nodes 102 can comprise a processor and associated circuitry to execute or direct the execution of computer-readable instructions to obtain information. Gateway nodes 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway nodes 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Access nodes 110 and 112 can be any network node configured to provide communication between relay wireless device 130, and wireless devices 140, 142, and 144, and communication network 101. Access nodes 110 and 112 can be a macrocell access node such as a base transceiver station, a radio base station, an eNodeB device, or the like. In an exemplary embodiment, a macrocell access node can have a coverage area 115 or 116 in the range of approximately five kilometers to thirty five kilometers and an output power in the tens of watts. In some embodiments, access nodes 110 and 112 may comprise coverage areas 115 and 116 that are smaller than five kilometers.

Small cell 131 may comprise a small access node, microcell access node, a picocell access node, a femtocell access node, or the like such as a home NodeB or a home eNodeB device. A coverage area for a small cell may be smaller than the coverage area for a macro cell (e.g., access node 110). Moreover, it is noted that while access nodes 110 and 112, and small cell 131 are illustrated in FIG. 1, any number of access nodes and/or small cells can be implemented within system 100.

Access node 110 and 112 and small cell 131 can comprise a processor and associated circuitry to execute or direct the execution of computer-readable instructions to obtain information. Access node 110 and 112 and small cell 131 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 110 and 112 and small cell 131 can receive instructions and other input at a user interface. Access node 110 communicates with gateway nodes 102 and controller node 104 via communication link 106, access node 112 communicates with gateway nodes 102 and controller node 104 via communication link 107, and access node 110 communications with access node 112 over communication link 108. Operations performed by one or all of access node 110 and 112, small cell 131, and/or relay wireless device 130 are further described herein with reference to FIGS. 4, 6, and 7.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
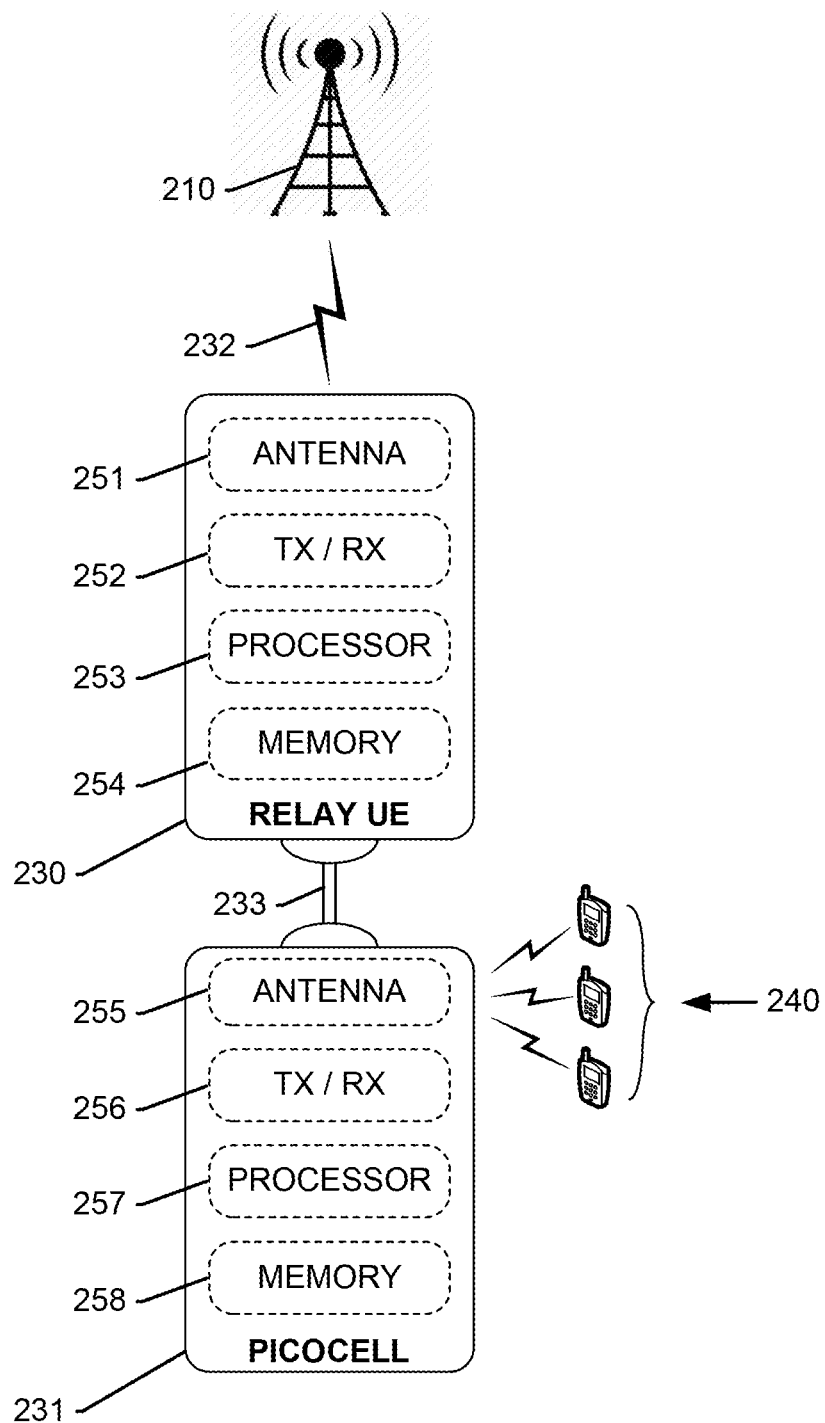
FIG. 2 depicts an exemplary relay wireless device coupled to a small cell.

FIG. 2 depicts an exemplary relay wireless device 230, or relay user equipment (UE), coupled to a small cell 231, or picocell. Relay wireless device 230 is illustrated as comprising an antenna 251 for direct (e.g., unrelayed) communication with access node 210 via communication link 232, a transceiver 252, a processor 253, and a memory 254 for storing instructions that enable relay wireless device 230 to perform operations described herein. In some embodiments, relay wireless device 230 is referred to as a customer premise equipment (CPE), which includes any stationary LTE wireless device having a stronger computational & RF capability versus standard wireless devices, as well as a directional antenna and a dedicated power supply, enabling relay wireless device 230 to efficiently provide resources to wireless devices 240 via small cell 231. Consequently, small cell 231 may be co-located with relay wireless device 230, and is connected to relay wireless device 230 via a communication interface 233. Communication interface 233 may be any interface that enables direct communication between relay wireless device 230 and small cell 231, such as USB, FireWire, Ethernet, or any other serial, parallel, analog, or digital interface. Small cell 231 is illustrated as comprising an antenna 255 for wireless communication with wireless device 240, a transceiver 256, a processor 257, and a memory 258 for storing instructions that enable small cell 231 to perform operations described herein. In some embodiments, small cell 231 may be a Home eNodeB. Moreover, although only one transceiver is depicted in each of relay wireless device 230 and small cell 231, additional transceivers may be incorporated in order to facilitate communication across interface 233 and other network elements.

In operation, relay wireless device 230 relays network services from access node 210 to wireless devices 240 (e.g., end-user wireless device) via small cell 231. Relay wireless device 230 may begin to function as a relay by sending a message to access node 210 to indicate to access node 210 that relay wireless device 230 is functioning as a relay. Access node 210 may consequently alter how relay wireless device 230 is assigned resources. In some embodiments, relay wireless device 230 can request to send a buffer status report to access node 210. Access node 210 can grant this request in a conventional manner. Relay wireless device 230 may respond to the grant by sending a short buffer status report. This short buffer status report may be associated with a logical channel group that indicates the buffer status report is communicating the status of the UE as a relay, and thus is not asking for additional resource allocations (like a 'conventional' buffer status report would indicate). In other words, in some embodiments, when a UE responds with a buffer status report for a predetermined logical channel group, it indicates that the UE is functioning as a relay rather than serving as a conventional buffer status report. Once status of relay wireless device 230 is established, relay wireless device 230 may instruct small cell 231 to start accepting connection requests from one or more of wireless devices 240.

Figure 3:
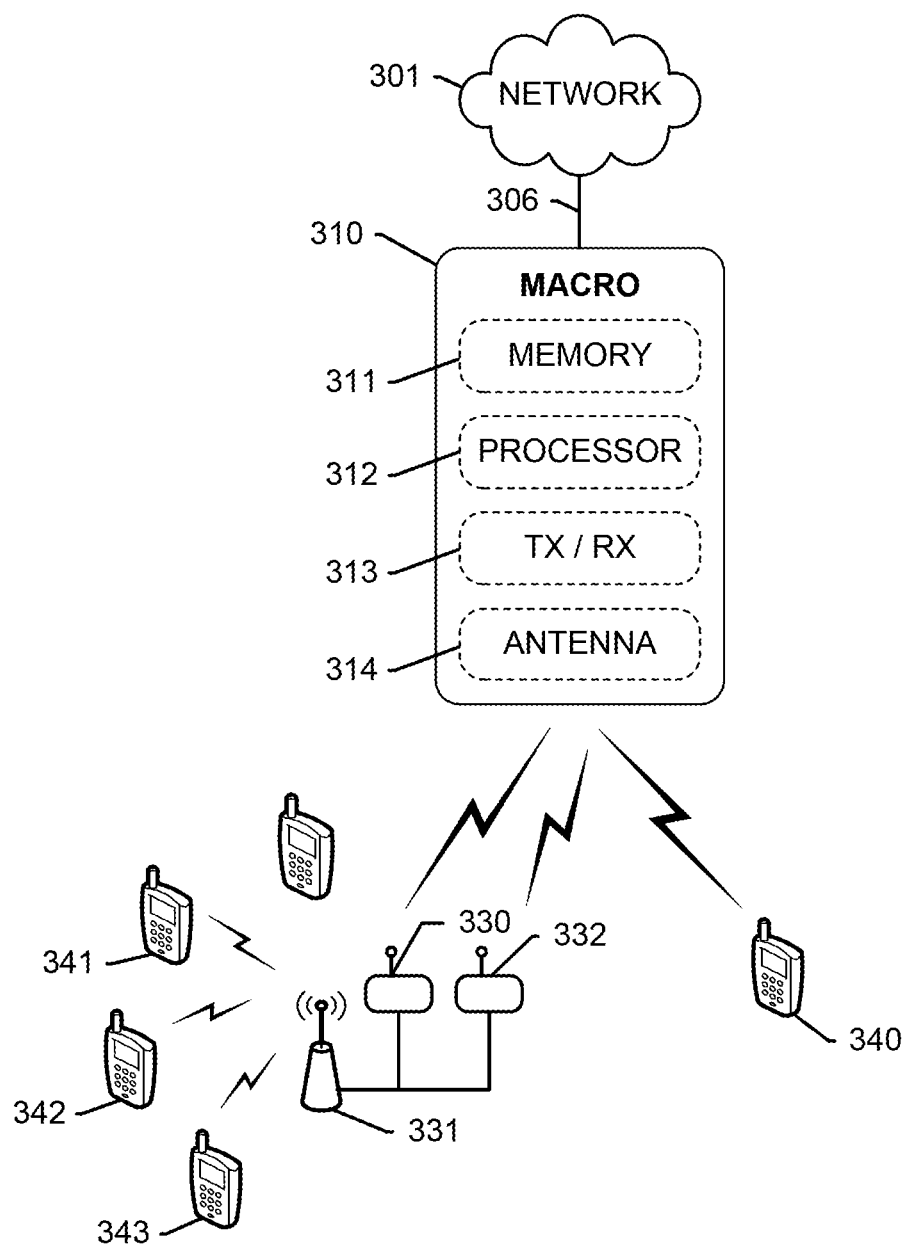
FIG. 3 depicts an exemplary access node.

FIG. 3 depicts an exemplary access node 310 which may comprise, for example, a macro access node. As described herein, access node 310 provides access to network services from network 301 to wireless devices 340, 341, 342, 343, which may comprise end-user wireless devices, either directly, or via relay wireless device 330 and smallcell 331. In this embodiment, access node 310 is illustrated as being in communication with network 301 via communication link 306, and comprising a memory 311 for storing instructions that enable access node 310 to perform operations described herein. Further, access node 310 comprises a processor 312 for executing operations, and a transceiver 313 coupled to an antenna 314 for wireless communication with one or more wireless devices, such as wireless device 340, or relay wireless device 330. Further, communication link 306 may be any interface that enables communication between access node 310 and network 301, such as an S1 interface. In some embodiments, access node 310 may be in communication with multiple relay wireless devices connected to small cell 331, such as one or both of relay wireless devices 330 and 332. Here, access node 310 provides access to network services from network 301 to wireless devices 340, 341, 342, 343, via relay wireless devices 330 and 332, and small cell 331. Other network nodes such as gateways and controllers may be present but are not shown for purposes of simplicity.

Referring back to FIG. 1, in operation, system 100 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In some embodiments, a donor access node may be selected for relay wireless device 130 based on signals received at the relay wireless device from potential donor access nodes. In an embodiment, relay wireless device 130 may periodically scan for potential donor access nodes and select a donor based on the scanning. However, certain signal arcs for relay wireless device 130 may experience interference or obstruction such that scanning over these one or more signal arcs may not provide useful received signal levels from potential donor access nodes for the purposes of donor selection. Accordingly, donor scanning and selection that considers the channel quality over signal arcs may provide benefits to users of the system.

Figure 4:
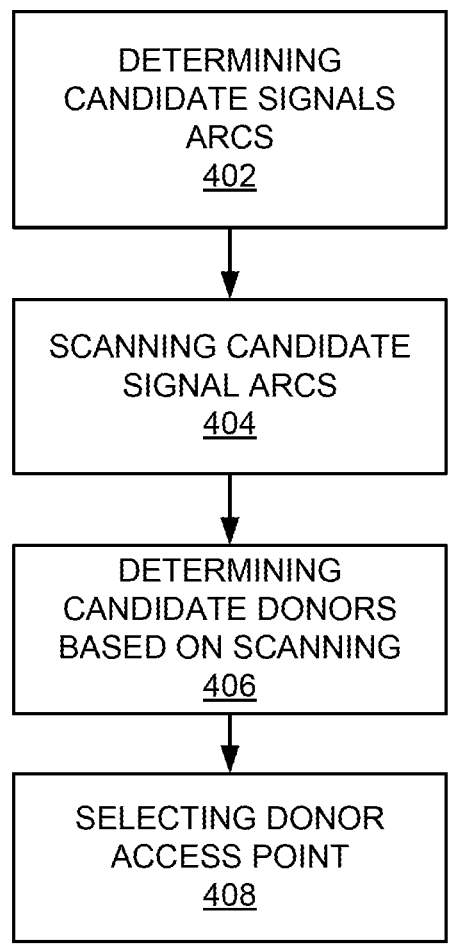
FIG. 4 depicts an exemplary method for selecting a donor for a relay wireless device.

FIG. 4 illustrates an exemplary method for selecting a donor for a relay wireless device according to an embodiment. The method will be discussed with reference to the exemplary communication system 100 illustrated in FIG. 1, however, the method can be implemented with any suitable communication system.

Referring to FIG. 4, at step 402, candidate signal arcs of the predetermined angle for the relay wireless device are determined that do not meet the interference criteria. For example, one or more signal arcs of a predetermined angle (e.g., 30° arcs, 60° arcs, 120° arcs, and the like), may be identified for relay wireless device 130 as meeting an interference criteria. The interference criteria may include a sounding criteria and a quality criteria. In an embodiment, one or more signal arcs of a predetermined angle, for relay wireless device 130 that do not meet the interference criteria may be determined based on the identified signal arcs that meet the interference criteria.

At step 404, signal levels for signals received from a plurality of donor access nodes may be scanned for the relay wireless device, the scanning iterating over the determined candidate signal arcs that do not meet the interference criteria. For example, signal levels (e.g., SINR levels) may be scanned for each candidate signal arc, that does not meet the interference criteria for relay wireless device 130. The scanning may detect signal from potential donor access nodes at a received signal level (e.g., SINR level).

At step 406, determining candidate donor access nodes with a received signal level at the relay wireless device that meets a signal level criteria for each candidate signal arc based on the scanning. For example, based on scanning of each of the candidate signal arcs, candidate donor access nodes, such as access nodes 110 and 112, may be determined when a signal level from the donor access node (e.g., SINR) meets a signal level criteria (e.g., SINR threshold).

Figure 5:
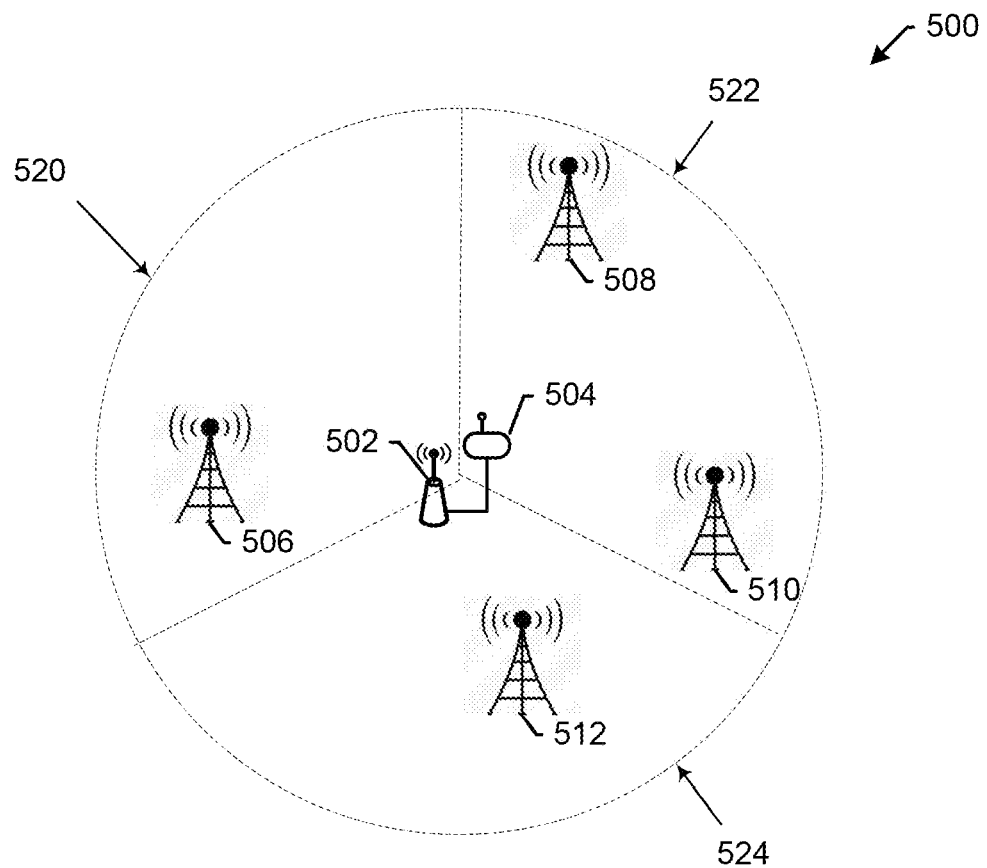
FIG. 5 depicts another exemplary system for selecting a donor for a relay wireless device.

At step 410, a donor access node is selected for the relay wireless device based on the determined candidate donor access nodes. For example, among access nodes 110 and 112, the access point that corresponds to the highest received signal level may be selected as the donor access node. Other donor access nodes may be selected based on additional criteria, such as load, congestion, and the like FIG. 5 depicts an exemplary system 500 for selecting a donor for a relay wireless device. System 500 comprises small cell 502, relay wireless device 504, access nodes 506, 508, 510, and 512, and sectors 520, 522, and 524. Access nodes 506, 508, 510, and 512 may be similar to access nodes 110 and 112 of FIG. 1. Similarly, small cell 502 may be similar to small cell 131 of FIG. 1 and relay wireless device 504 may be similar to relay wireless devices 130 of FIG. 1. In an embodiment, access nodes 506, 508, 510, and 512, and small cell 502 may service a plurality of (end-user) wireless devices.

In an embodiment, system 500 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In some embodiments, an access node or small cell may be divided into a plurality of cells. For example, a cell may comprise a sector for the access node or small cell. A sector may comprise an arc (such as a 120° arc) where a plurality of sectors comprise a coverage area for the access node or small cell (e.g., three 120° sectors, six 60° sectors, and the like). In an embodiment, a signal area surrounding a relay wireless device may similarly be divided into 30° arcs, 60° arcs, 120° arcs, and the like. For example, a signal area surround relay wireless device 504 may comprise of three 120° signal arcs 520, 522, and 524. In an embodiment, relay wireless device 504 and small cell 502 may be incorporated, and the signal arcs 520, 522, and 524 may comprise sectors of small cell 502.

In operation, a donor access node may be selected for relay wireless device 504 based on signals received at the relay wireless device from potential donor access nodes (e.g., donor access nodes 506, 508, 510, and 512). In an embodiment, relay wireless device 504 may periodically scan for potential donor access nodes and select a donor based on the scanning. However, certain signal arcs (e.g., one or more of signals arcs 520, 522, and 524) for relay wireless device 504 may experience interference or obstruction such that scanning over these one or more signal arcs may not provide useful received signal levels from potential donor access nodes for the purposes of donor selection. Accordingly, donor scanning and selection that considers the channel quality over signal arcs may provide benefits to users of the system.

Figure 6:
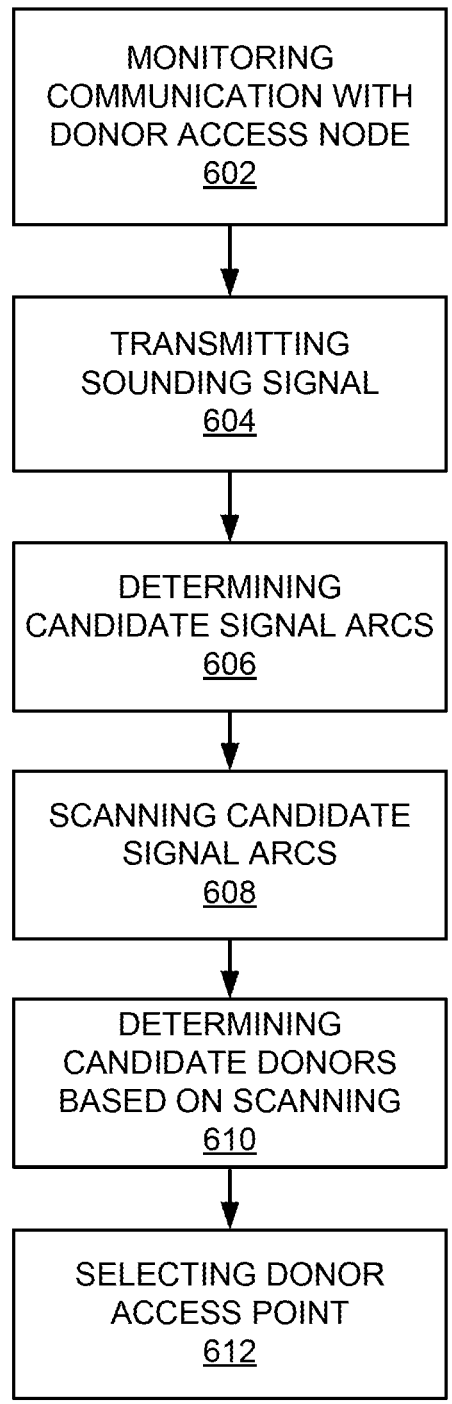
FIG. 6 depicts another exemplary method for selecting a donor for a relay wireless device.

FIG. 6 illustrates an exemplary method for selecting a donor for a relay wireless device according to an embodiment. The method will be discussed with reference to the exemplary communication system 500 illustrated in FIG. 5, however, the method can be implemented with any suitable communication system.

Referring to FIG. 6, at step 602 data may be communicated between a relay wireless device and a donor access node. For example, data may be communicated between relay wireless device 504 and access node 506, the donor access node, for example to service end-user wireless devices communicating with small cell 502.

In an embodiment, the signal level quality for signal arcs of the predetermined angle when communicating with the donor access node may be monitored by relay wireless device 504. For example, for each of signal arcs 520, 522, and 524, received signal quality levels (e.g., SINR values, or the like) may be monitored to determine whether any signal arc experience high levels of interference.

In an embodiment, it may be determined that one or more signal arcs of the predetermined angle (e.g., 30° arcs, 60° arcs, 120°, and the like) meet the interference criteria when the monitored signal level quality fails to meet a quality criteria. For example, the quality criteria may comprise a SINR threshold, or any other suitable quality criteria. In another example, the quality criteria may be based on received signal levels for the remaining signal arcs. For example, received signal levels may be monitored for signal arcs 520, 522, and 524, and an average received signal level may be calculated. The individual received signal levels for signal arcs 520, 522, and 524 may be compared to the average received signal level, and when a deviation for a particular signal arc meets or exceeds a deviation threshold (e.g., 10%, 20%, or the like) it may be determined that the particular signal arc is experiencing interference.

At step 604, transmitting, from a relay wireless device, a sounding signal over signal arcs of the predetermined angle, the relay wireless device detecting signal levels sensed at the relay wireless device from the sounding signal. For example, relay wireless device 504 may transmit a signal, such as a sounding reference signal, over each arch of the predetermined angle (e.g., signal arcs 520, 522, and 524) iteratively.

In an embodiment, the sounding reference signal may be a narrow band or wide band sounding reference signal.

In an embodiment, it may be determined that one or more signal arcs of the predetermined angle meet the interference criteria when detected signal levels at the relay wireless device from the sounding signals meet a minimum sounding criteria. For example, relay wireless device 504 may be instructed to transmit a sounding reference signal over an individual signal arc and subsequently monitor for signal received at the relay wireless device that comprise reflections of the sounding reference signal. Based on the configuration for the sounding reference signal (e.g., wide band or narrow band), relay wireless device 504 may be instructed to monitor one or more frequencies for the reflect.

At step 606, one or more signal arcs of a predetermined angle that meet an interference criteria are identified for a relay wireless device. For example, one or more signal arcs of a predetermined angle (e.g., signal arcs 520, 522, and 524), may be identified for relay wireless device 504 as meeting an interference criteria. The interference criteria may include a sounding criteria and quality criteria.

In an embodiment, it may be determined that one or more signal arcs of the predetermined angle meet the interference criteria when signal levels monitored for the signal arcs fail to meet the quality criteria. For example, as described with reference to step 604, signal levels may be monitored for the signal arcs (e.g., signal arcs 520, 522, and 524) during communication with a donor access node. When the monitored signal level over a particular signal arc fails to meet the quality criteria, it may be determined that particular signal arc meets the interference criteria.

In an embodiment, it may be determined that one or more signal arcs of the predetermined angle meet the interference criteria when detected signal levels at the relay wireless device from a transmitted sounding signals over the individual signal arcs, as described with reference to step 604, meet a minimum sounding criteria. For example, relay wireless device 504 may be instructed to transmit the sounding reference signal over an individual signal arc and subsequently monitor for signal received at the relay wireless device that comprise reflections of the sounding reference signal.

In an embodiment, one or more signal arcs of a predetermined angle for relay wireless device 520 that do not meet the interference criteria may be determined based on the identified signal arcs that meet the interference criteria. For example, from among signal arcs 522, 524, and 526, signal arc 526 may be identified as meeting the interference criteria, and signal arcs 522 and 524 may be determined as not meeting the interference criteria.

At step 608, signal levels for signals received from a plurality of donor access nodes may be scanned for the relay wireless device, the scanning iterating over the determined candidate signal arcs that do not meet the interference criteria. For example, signal levels (e.g., SINR levels) may be scanned for each candidate signal arc that does not meet the interference criteria for relay wireless device 504. The scanning may detect signal from potential donor access nodes (e.g., pilot signals or reference signals) at a received signal level (e.g., SINR level, RSRP level).

In an embodiment, the scanning may be performed by a device other than the relay wireless device. For example, a scanning device comprising one or more antennas may be placed proximate to relay wireless device 504 such that the scanning device may receive signals from potential donor access nodes that are indicative of the received signals at relay wireless device 504. In an embodiment, the scanning may occur over an individual candidate signal arc determined not to meet the interference criteria (e.g., signals arcs 520 and 522), such that the candidate signal arcs are iterated over until each has been scanned. For example, the one or more antennas of the scanning device may be configured to scan for received signals from potential donor access nodes over individual signal arcs for each iteration (e.g., by mechanically moving the one or more antennas or by some other means).

At step 610, determining candidate donor access nodes with a received signal level at the relay wireless device that meets a signal level criteria for each candidate signal arc based on the scanning. For example, based on scanning of each of the candidate signal arcs candidate donor access nodes, such as access nodes 506, 508, 510, and 512, may be determined when a signal level from the donor access node (e.g., SINR, RSRP) meets a signal level criteria (e.g., SINR threshold, RSRP threshold).

In an embodiment, based on scanning over each candidate signal arc that does not meet the interference criteria (e.g., signal arcs 520 and 522) a received signal levels may be associated with the signal arc that was scanned to receive the signal level. For example, a received signal level from access node 506 may be associated with signal arc 520 during the scan for that signal arc and a received signal level from access node 506 may be associated with signal arc 522 during the scan for that signal arc. In an embodiment, when one of the received signal levels meets the signal level criteria, the access node may be determined to be a candidate donor access node. In an embodiment, each of received signal levels associated with the signal arcs must meet the signal level criteria, for the access node to be determined to be a candidate donor access node. In this example, signal levels from access nodes 506 and 510 may be received such that these access nodes are determined to be candidate donor access nodes for relay wireless device 504.

At step 612, a donor access node is selected for the relay wireless device based on the determined candidate donor access nodes. For example, among access nodes 506 and 510, the access node that corresponds to the highest received signal level may be selected as the donor access node. Other donor access nodes may be selected based on additional criteria, such as load balancing, congestion, and the like.

In an embodiment, the list of potential donor access nodes (e.g., access nodes 506 and 510) may be ranked according to received signal levels for the access nodes during the scanning. In an embodiment, selecting the donor access node may be based on the ranking for the list of potential donor access nodes and a monitored load for the ranked potential access nodes. For examples, access nodes 506 and 510 may be ranked according to a first ranking, and where the loads on the access nodes falls below a load criteria, the highest ranked access node may be selected as the donor access node. In another example, where a load for the highest ranked access node meets or exceeds the load criteria, the second highest ranked access node may be selected. In other words, a potential donor access node may be selected for relay wireless device 504 according to the ranking, however when a load for a potential donor access node meets or exceeds the load criteria, the access node may be skipped in the ranking.

In an embodiment, load at the potential donor access nodes may be based on one or more of resource block utilization for the access node, number of connections to wireless devices (e.g., RRC connections), memory utilization, a processor utilization, and any other suitable metric. The load criteria may comprise one or more of a threshold for resource block utilization threshold, a threshold number of connections to wireless devices, a memory utilization threshold, a processor utilization threshold, and any other suitable threshold.

In an embodiment, backhaul data may be communicated between the relay wireless device and the selected donor access node. For example, relay wireless device 504 may select access node 510, and relay wireless device 504 may connect to access node 510 (e.g., via a handover) or may stay connected to access node 510. In an embodiment, backhaul data (e.g., for small cell 502) may be communicated between relay wireless device 504 and access node 510 (e.g., the selected donor access node) to service end-user wireless devices.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 310, relay wireless devices 130, 230, gateway nodes 102, and/or network 101.

Figure 7:
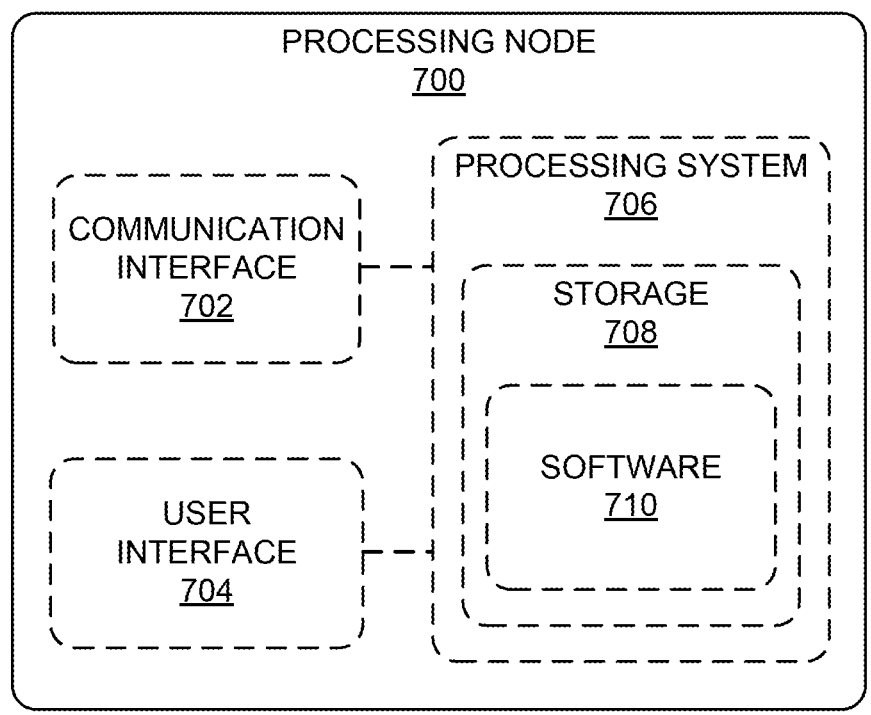
FIG. 7 depicts an exemplary processing node.

FIG. 7 depicts an exemplary processing node 700 comprising communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. For example, software 710 may include modules for perform the operations described with reference to FIGS. 4 and 6. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for selecting a macrocell donor access node for a relay wireless device of a cellular communication network, the method comprising:
    transmitting, from the relay wireless device, a sounding signal over a plurality of signal arcs of a predetermined angle, the relay wireless device detecting signal levels of reflections received at the relay wireless device from the sounding signal;
    detecting reflections from the sounding signals at the relay wireless device;
    measuring signal levels of the detected reflections;
    identifying one or more signal arcs of the predetermined angle, from the plurality of signal arcs of the predetermined angle, that have measured signal levels that satisfy one or more quality criteria indicative of sufficiently low interference, obstruction, or both of the sounding signal;
    scanning for access node signals sent from a plurality of macrocell donor access nodes in the cellular communication network and received at the relay wireless device, the scanning iterating over the identified one or more signal arcs;
    detecting the access node signals at the relay wireless device;
    measuring signal levels of the access node signals;
    determining candidate macrocell donor access nodes that have measured signal levels satisfying one or more signal level criteria;
    ranking the candidate macrocell donor access nodes according to one or more selection criteria; and
    selecting a macrocell donor access node from the determined candidate macrocell donor access nodes to receive backhaul data, wherein the selection is based on the ranking and loads of the candidate macrocell donor access nodes, and a highest ranked macrocell donor access node is selected when a load of the highest ranked macrocell donor access node falls below one or more load criteria, and a second highest ranked macrocell donor access node is selected when the highest ranked macrocell donor access node meets or exceeds the one or more load criteria.

2. The method of claim 1, wherein the sounding signal comprises a sounding reference signal.

3. The method of claim 1, wherein the signal arcs of the predetermined angle together comprise a signal area surrounding the relay wireless device.

4. The method of claim 3, wherein the predetermined angle for the signals comprise 30 degree arcs or 60 degree arcs.

5. The method of claim 1, wherein the one or more signal level criteria comprise a signal to noise plus interference ratio (SINR) threshold, a reference signal received power (RSRP) threshold, or both.

6. The method of claim 1, wherein the one or more selection criteria comprise measured signal level of a candidate macrocell donor access node.

7. The method of claim 1, wherein the one or more selection criteria comprise measured signal level, or congestion, or a combination thereof.

8. The method of claim 1, wherein the one or more quality criteria comprise a signal to noise plus interference ratio (SINR) threshold, a reference signal received power (RSRP) threshold, or both.

9. The method of claim 1, further comprising monitoring the loads.

10. The method of claim 1, wherein the one or more load criteria comprise one or more of a threshold for resource block utilization threshold, a threshold number of connections to wireless devices, a memory utilization threshold, and a processor utilization threshold.

11. A system for selecting a macrocell donor access node for a relay wireless device of a cellular communication network, the system comprising:
    the relay wireless device comprising a processor configured to:
        transmit, from the relay wireless device, a sounding signal over a plurality of signal arcs of a predetermined angle, the relay wireless device detecting signal levels of reflections received at the relay wireless device from the sounding signal;
        detect reflections from the sounding signals at the relay wireless device;
        measure signal levels of the detected reflections;
        identify one or more signal arcs of the predetermined angle, from the plurality of signal arcs of the predetermined angle, that have measured signal levels that satisfy one or more quality criteria indicative of sufficiently low interference, obstruction, or both of the sounding signal;
        scan or cause a scanning device to scan for access node signals sent from a plurality of macrocell donor access nodes in the cellular communication network, the scanning iterating over the determined signal arcs;
        detect the access node signals at the relay wireless device;
        measure signal levels of the access node signals;
        determine candidate macrocell donor access nodes that have measured signal levels satisfying one or more signal level criteria;
        rank the candidate macrocell donor access nodes according to one or more selection criteria; and
        select a macrocell donor access node from the determined candidate macrocell donor access nodes to receive backhaul data, wherein the selection is based on the ranking and loads of the candidate macrocell donor access nodes, and a highest ranked macrocell donor access node is selected when a load of the highest ranked macrocell donor access node falls below one or more load criteria, and a second highest ranked macrocell donor access node is selected when the highest ranked macrocell donor access node meets or exceeds the one or more load criteria.

12. The system of claim 11, wherein the sounding signal comprises a sounding reference signal.

13. The system of claim 11, wherein the signal arcs of the predetermined angle together comprise a signal area surrounding the relay wireless device.

14. The system of claim 13, wherein the predetermined angle for the signals comprise 30 degree arcs or 60 degree arcs.

15. The system of claim 11, wherein the one or more signal level criteria comprise a signal to noise plus interference ratio (SINR) threshold, a reference signal received power (RSRP) threshold, or both.

16. The system of claim 11, wherein the one or more selection criteria comprise measured signal level of a candidate macrocell donor access node.

17. The system of claim 11, wherein the one or more selection criteria comprise the measured signal level, or congestion, or a combination thereof.

18. The system of claim 11, wherein the one or more load criteria comprise one or more of a threshold for resource block utilization threshold, a threshold number of connections to wireless devices, a memory utilization threshold, and a processor utilization threshold.

\* \* \* \* \*